March 3, 1964    A. K. HAMMELL    3,123,324
CONTROL APPARATUS
Filed Dec. 26, 1962    3 Sheets-Sheet 1

INVENTOR.
ALLAN K. HAMMELL
BY *Gordon Reed*
ATTORNEY

INVENTOR.
ALLAN K. HAMMELL
BY
ATTORNEY

United States Patent Office 3,123,324
Patented Mar. 3, 1964

3,123,324
CONTROL APPARATUS
Allan K. Hammell, Golden Valley, Minn., assignor to Minneapolis-Honeywell Regulator Company, Minneapolis, Minn., a corporation of Delaware
Filed Dec. 26, 1962, Ser. No. 247,086
19 Claims. (Cl. 244—77)

This invention pertains to automatic control apparatus such as automatic steering mechanisms for dirigible craft. Such dirigible craft may be aircraft of the type provided with attitude changing means an example being a pair of control surfaces one in each wing surface, the control surfaces often being known as elevons. Both elevons are operable together in two ways, in one case they may be moved about their supporting axes in the same direction to act as elevators for the aircraft and in the other case may be operated about their supporting axes in opposite directions to act as ailerons. Automatic control apparatus for such type of aircraft control surfaces are broadly old in the U.S. patent to Kutzler 2,634,925 and the U.S. patent to Frystak 2,655,328.

While aircraft with such automatic elevon control include a yaw control surface such as a rudder along with the above recited elevons, the invention herein is concerned solely with the operation of the elevon surfaces. While it is old in Kutzler 2,634,925 above to provide integral control of elevons in the aileron function for maintaining the heading of an aircraft despite mistrim, it is an object of this invention to provide integral control of the elevons in the elevator effect only and to provide proportional control of the elevons for the aileron effect.

It is a further object of this invention to provide for the above control apparatus having integral control of elevator and proportional control of ailerons, manual devices or manual inputs so arranged that they provide proportional control both for elevator effect and aileron effect.

The above and further objects of the invention will be apparent upon consideration of the following detailed description taken in conjunction with the drawings disclosing two embodiments thereof.

Figure 1:
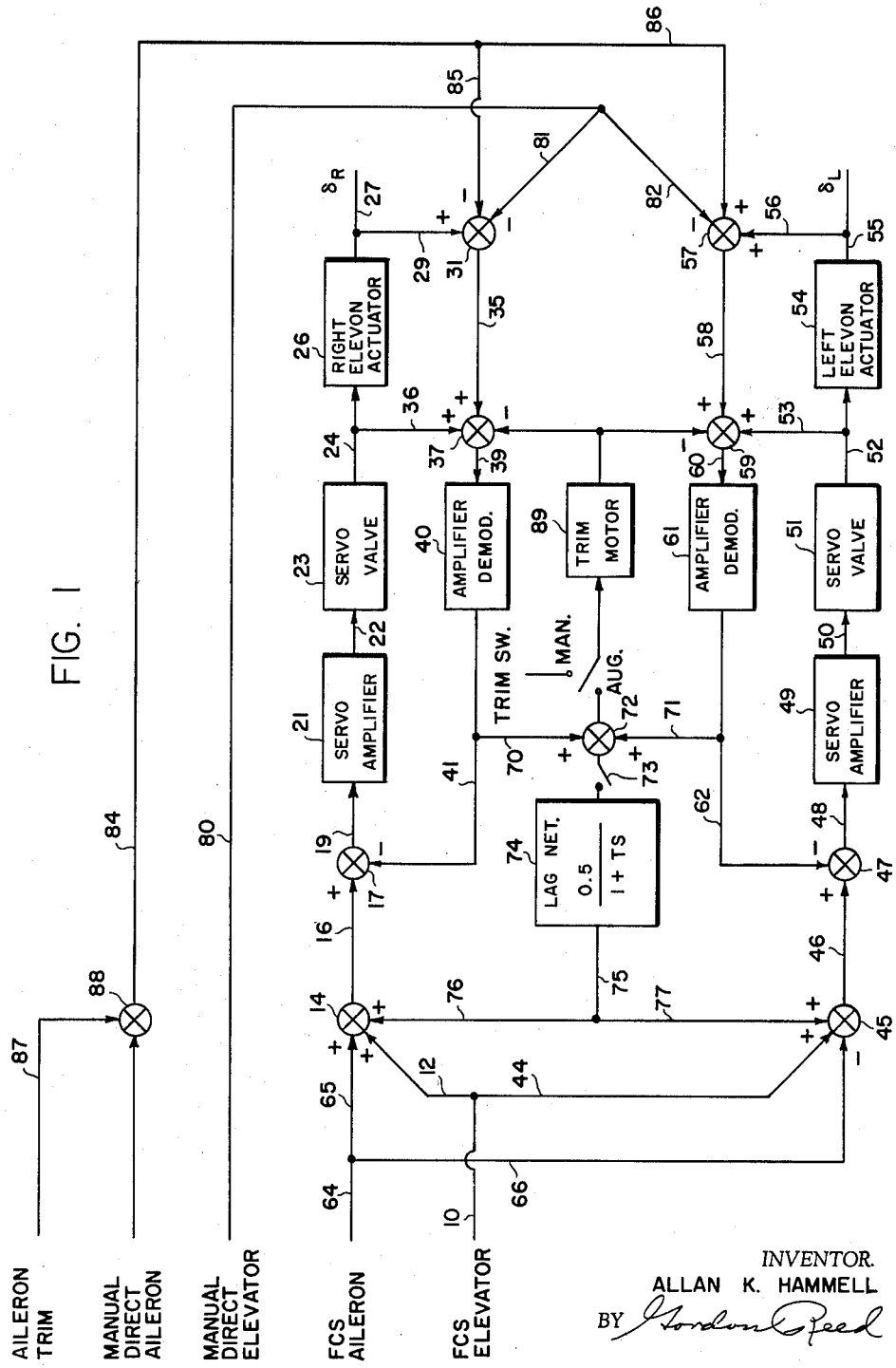
FIGURE 1 is a block diagram of an elevon control system embodying one integrating actuator arrangement.

In connection with a general discussion of the invention herein and to bring out its advantages, reference may be made to Kutzler 2,634,925. Kutzler shows a source of control signal such as potentiometer 161 operated from a directional gyro 170 which potentiometer has its output supplied through relay contacts 132, 127 and 302, 301 to an amplifier 290 controlling an integrating motor 284 operating an integrating potentiometer 401. The output of integrating potentiometer 401 controls the two elevon servomotors 212, 273 in FIGURE 1(b). These two servos operate followup potentiometers 225, 321 to follow the integrator 401. It is clear that a pitch attitude sensor could be provided with an integrator in the same way as the integrator 284 was provided for the heading sensor 170 in Kutzler.

However, the inability of the elevon actuators or servomotors in some instances to follow the pitch integrator command, due to rate and hinge moment limiting for example, causes the integrator to over integrate and induces a limit cycle oscillation in the automatic control apparatus. Thus such prior mechanization of the integrator is unsatisfactory due to the limit cycle instability and two mechanisms providing the same or equivalent integration function are described herein which will eliminate the problem above.

The proposed mechanization provides the integration in the actuator loop namely the actuator feedback loop thus eliminating any possible mismatch between the integrator and the actuator or servomotor. This integration function is accomplished by generating an equivalent highpass effect in the control system actuator feedback loop for each of two actuators. Yet since the elevon actuators provide both aileron and elevator functions or aileron and elevator effects and the pitch integral effect is required in the elevator axis only then to prevent integration effect for both elevator and aileron function an additional or cross feed mechanization in the actuator feedback loops is required.

Figure 2:
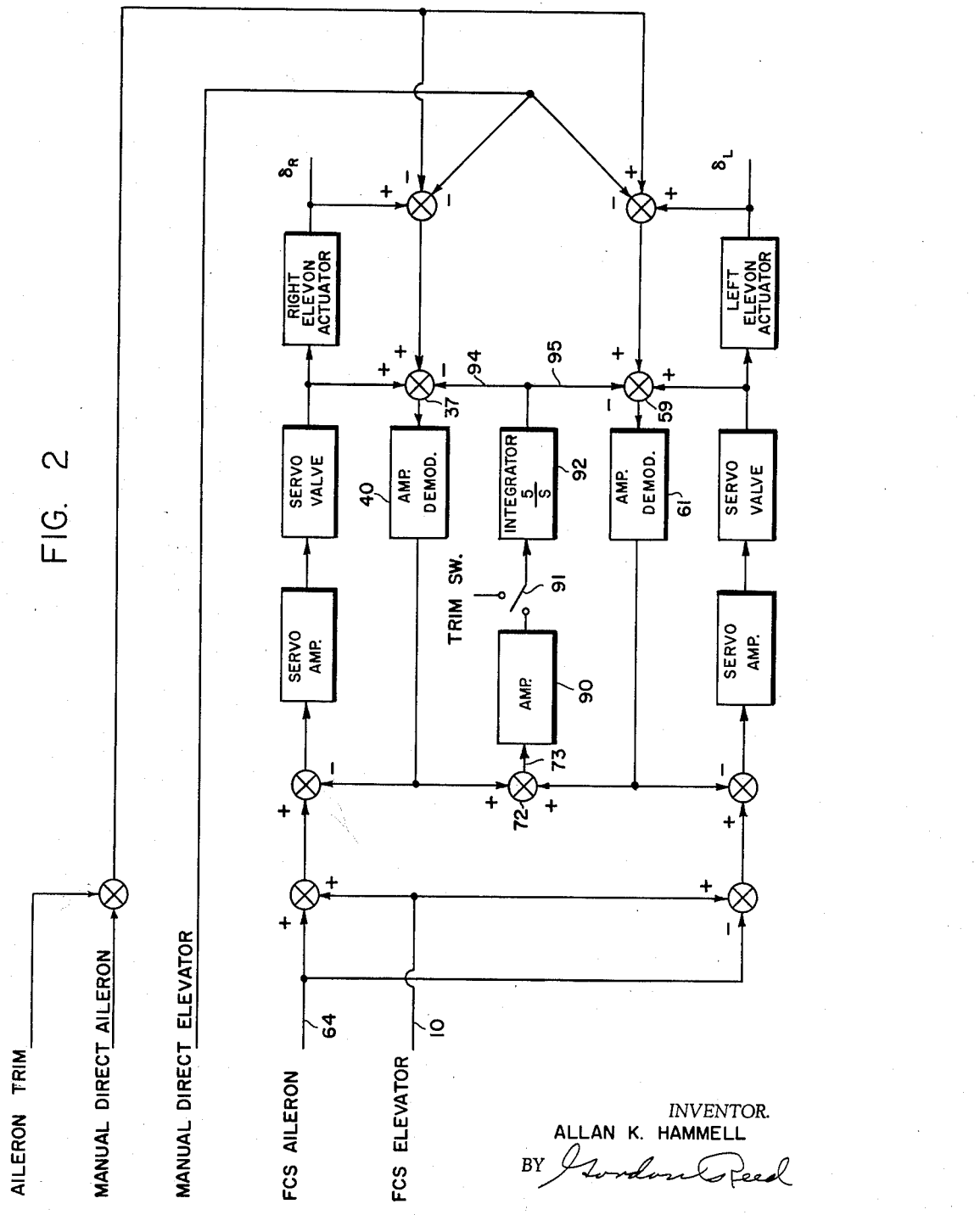
FIGURE 2 is a block diagram of an elevon control system embodying a second integrating actuator arrangement.

Two feasible and easily mechanized configurations for obtaining the desired dynamic performance are shown in block diagram form in FIGURES 1 and 2. Both figures provide isolation between the aileron and elevator command from the trim, manual direct, and the conventional stabilization loops with the integration acting only on the pitch stabilization loop.

In FIGURE 1, the outputs of the amplifier demodulator are summed, fed through a passive lag network and into each servo amplifier with a sign opposite to that of the normal feedback loop. This lag network combined with the normal feedback generates an equivalent high pass in the feedback loop for symmetric left and right elevon position. Any aileron position (differential elevon) causes equal and opposite voltages on the amplifier demodulator which when summed through the lag network is zero and has no effect.

Automatic pitch trim is obtained by driving a switching amplifier and trim integrator from the sum of the two amplifier demodulator outputs. The trim has the effect of driving the output of the amplifier demodulator to zero thus unloading the lag network. By summing the pitch manual direct and pitch trim signals at the input to the amplifier demodulator, they are upstream of the equivalent high pass feedback and are not integrated.

Referring to FIGURE 1, and in view of both the Kutzler and Frystak patents above, an automatic flight control system for operation of the elevon control surfaces of an aircraft may provide a pitch stabilization elevator function signal over conductor 10 and a subconductor 12 to a summing device 14 having its output in turn supplied through conductor 16 to a second summing device 17. The output from summing device 17 is supplied through conductor 19 to a servomotor amplifier 21 which in turn through conductor 22 controls operating means that determines the direction of operation of a servo valve 23 from its normal position. The displacement of the servo valve 23 effects a control through transmitting means 24 to a right elevon surface fluid actuator 26. The displacement of servo valve 23 is also supplied through signal developing and transmission means 36 to a third summing device 37, said transmission means 36 including means for providing a valve displacement signal. If the valve displacement signal be of A.C. type, it may be supplied through transmission means 39 to an amplifier demodulator 40 which converts the A.C. signal to a D.C. signal which in turn is then transmitted through conductor 41 to the second summing device 17 where it is combined with the other D.C. input signals from conductor 16. Thus far it will be apparent that the servo or actuator control valve is displaced in accordance with the magnitude of the signal on conductor 16.

The right elevon fluid actuator 26 operates the right elevon (not shown) of the aircraft. The elevon actuator also develops a feedback signal through signal providing and transmission means 29 which is supplied to a fourth summing device 31. The output from device 31 is supplied through transmission means 38 to the third summing device 37. It will thus be apparent that the servo position feedback signal over transmission means 29 will result in the control surface being displaced in accordance with the input signals on conductor 16, meanwhile due to the signal on the servo valve position feedback transmission means 36, the valve will be restored to its centered or unoperated position.

A similar arrangement is provided for the operation of the left elevon control surface of the aircraft in that the signal from transmission means 10 is supplied over conductor 44 to a fifth summing device 45 having its output supplied through transmission means 46 to a sixth summing device 47 having in turn its output supplied through transmission means 48 to effect operation of servoamplifier 49. The servoamplifier 49 through its transmission means 50 effects the displacement of the servo control valve 51 from a normal unoperated position, and the operation of the servo valve through transmission means 52 controls the left elevon fluid actuator 54 and also supplies a valve displacement signal through signal providing and transmission means 53 to the seventh summing device 59. Again if the servo valve position feedback signal be of A.C. type it is supplied through transmission means 60 and amplifier demodulator 61 and conductor 62 to the sixth summing device 47. The operation of the surface actuator 54 through its transmission means 55 positions the left elevon (not shown) from a normal unoperated position. The operation of the actuator 54 is also supplied through signal providing and transmission means 56 which generates a servo or actuator position signal which is supplied to a summing device 57 having its output supplied through transmission means 58 to the seventh summing device 59.

In a similar way, roll stabilization aileron function signals may be supplied over conductor 64 and subconductor 65 to summing device 14 and also from conductor 64 through subconductor 66 to summing device 45. The algebraic symbols in FIGURE 1 denote the relative polarities or phasings of the various signals. For example, the elevator function signal on conductors 12 and 44 is of like sign indicating that the two elevons as the result of a control signal calling for craft pitch change will be operated in the same direction whereas the signals on conductors 65 and 66 are summed into their respective summing points 14, 45 with opposite polarity or phase indicating as shown that the elevon surfaces will be operated in opposite directions as the result of a control signal calling for craft roll change.

Thus far we have as conventional an elevon control system of the proportional type wherein the elevon surfaces are displaced in accordance with the resultant electrical signals on conductors 16 and 46. No integral control thus far is provided.

The manner of providing the integration effect solely in the elevator channel or on the pitch command signal will now be considered. For the purpose of achieving the integral control as well as the proportional control for the elevator function signals, the displacement feedback signal on conductor 41 is also supplied through conductor 70 to a ninth summing device 72 having its output supplied through conductor 73 to a lag network 74 having the transfer function $$\frac{0.5}{1+TS}$$

therein shown wherein S is the LaPlace operator. The signals on conductors 41 and 70 are summed into their respective summing points with opposite polarity. The output from lag device 74 is supplied through transmission means 75 and transmission means 76 to summing device 14. It will be noted that the algebraic sign of the signal on transmission means 76 is opposite to that on transmission means 41. While these two signals are shown as applied to two separate summing devices 14 and 17, they may be directly combined.

As the result of such combination, they may, by servomechanisms analysis, show that their sum yields the expression $$\frac{TS}{1+TS}$$

where S is the LaPlace operator and T is the time constant of the lag device 74. Also by conventional servomechanism analysis it can be shown that with the gain K of servo amplifier 21 very high and because of the integration $1/S$ provided by the elevon actuator 26 through its servo valve 23 so that their combined transfer function is $K/S$, a desired proportional plus integral control expressed as $$\frac{1+TS}{TS} \text{ or } \frac{1}{TS}+1$$

of the right elevon is provided.

While the arrangement described above provides both proportional and integral control, integral control only may be achieved by providing a lag device between conductor 10 and the conductors 12, 44 electrically in parallel.

In a similar manner in the left elevon channel, the output on transmission means 62 is supplied through a second transmission means 71 to summing device 72 from whence it is supplied through operable switch means 73, lag network 74, transmission means 75, transmission means 76 to summing device 45. The signals on transmission means 62, 71 are summed into the respective summing devices 47, 72 with opposite polarity.

It can also be shown that by the above arrangement the elevon actuator 54 operates the left elevon in a desired proportional plus integral control manner in response to elevator function signals on transmission means 10.

It will be noted that with respect to the inputs to the summing device 72 from transmission means 70 and 71 for the elevator function since these inputs are the same, the gain of lag network 74 is 0.5 thereby providing the proper output on transmission means 75 proportional to the lag device input on 73.

With respect to the aileron function signals supplied to the control system over conductor 64, it will readily appear that the feedback signal supplying an input to summing device 72 on transmission means 70 is of opposite sign to that on transmission means 71 whereby the two equal but opposite signals cancel each other and thus there is no input on switch means 73 to lag network 74 due to the aileron function command signals.

Thus briefly from FIGURE 1, the outputs of the amplifier demodulators 48, 61 are summed, fed through a passive lag network 74 and into each servoamplifier 21, 49, with a sign opposite to that of the normal feedback loop on transmission means 41, 62. The lag network 74 output combined with the normal feedback signals generates an equivalent high pass $$\frac{TS}{1+TS}$$

into feedback loop for symmetric right and left elevon position.

Any aileron position (differential elevon) causes equal and opposite voltages on the amplifier demodulator which when summed through the lag network 74 is zero and has no effect.

Provisions are included in FIGURE 1 to provide direct manual elevator function control through transmission means 80, further transmission means 81, 82 to respective summing devices 31, 57. Also provisions are included for introducing manual direct aileron function control through transmission means 84, transmission means 85 to summing device 31 and from transmission means 84, transmission means 86 to summing device 57 so that the manual control as summed in summing devices 31, 57 is of opposite polarity. Furthermore aileron trim corrections may be introduced through transmission means 87 and summing device 88 to transmission means 84.

A selectively controlled trim motor means 89, with its switch in the "AUG." position by supplying a signal to devices 37, 59 has the effect of driving the output of the amplifier demodulators 40, 61 to zero thus unloading lag network 74.

In the modification shown in FIGURE 2, the high pass feedback $$\frac{TS}{1+TS}$$

is generated by an integrating feedback around the amplifier demodulators 40, 61. In FIGURE 2, the output of feedback signals summing device 72 is supplied through switch means 73 to an amplifier 90 which through a switching device 91 in the "AUG." position controls an integrator 92 which may be of the motor operated type having its output signal supplied through transmission means 94 on the one hand to summing device 37 and having its output supplied through transmission means 95 to summing device 59. The gain of the integrator $1/T$ which is the ratio of its speed to input signal is suitably proportioned to supply the proper feedback on 94, 95. In the present instance the gain $1/T$ of the integrator is 5.

It will be evident that the arrangement in FIGURE 2 is generally similar to a "canceller" arrangement shown for example in Yates, Jr. Patent 2,764,370. In Yates 2,764,370, FIGURE 3(a), the output from the servo rebalance potentiometer 32 is supplied to the cancelling arrangement comprising the signal generator 41, the motor control unit 47, motor 46, and velocity signal generator 50.

Thus the arrangement in Yates is a proportional plus integral control insofar as stated in column 8, beginning line 7 "The canceller source 41 is included in the system to nullify the tendency of source 32 to return the ailerons to their neutral positions at times when the ailerons need to be continuously displaced in order to keep the aircraft in level flight."

In view of the fact that the arrangement in FIGURE 2 is similar otherwise to that in FIGURE 1 with the exception of providing the integral control by the use of the integrator motor 92, further description of FIGURE 2 appears superfluous.

Figure 3:
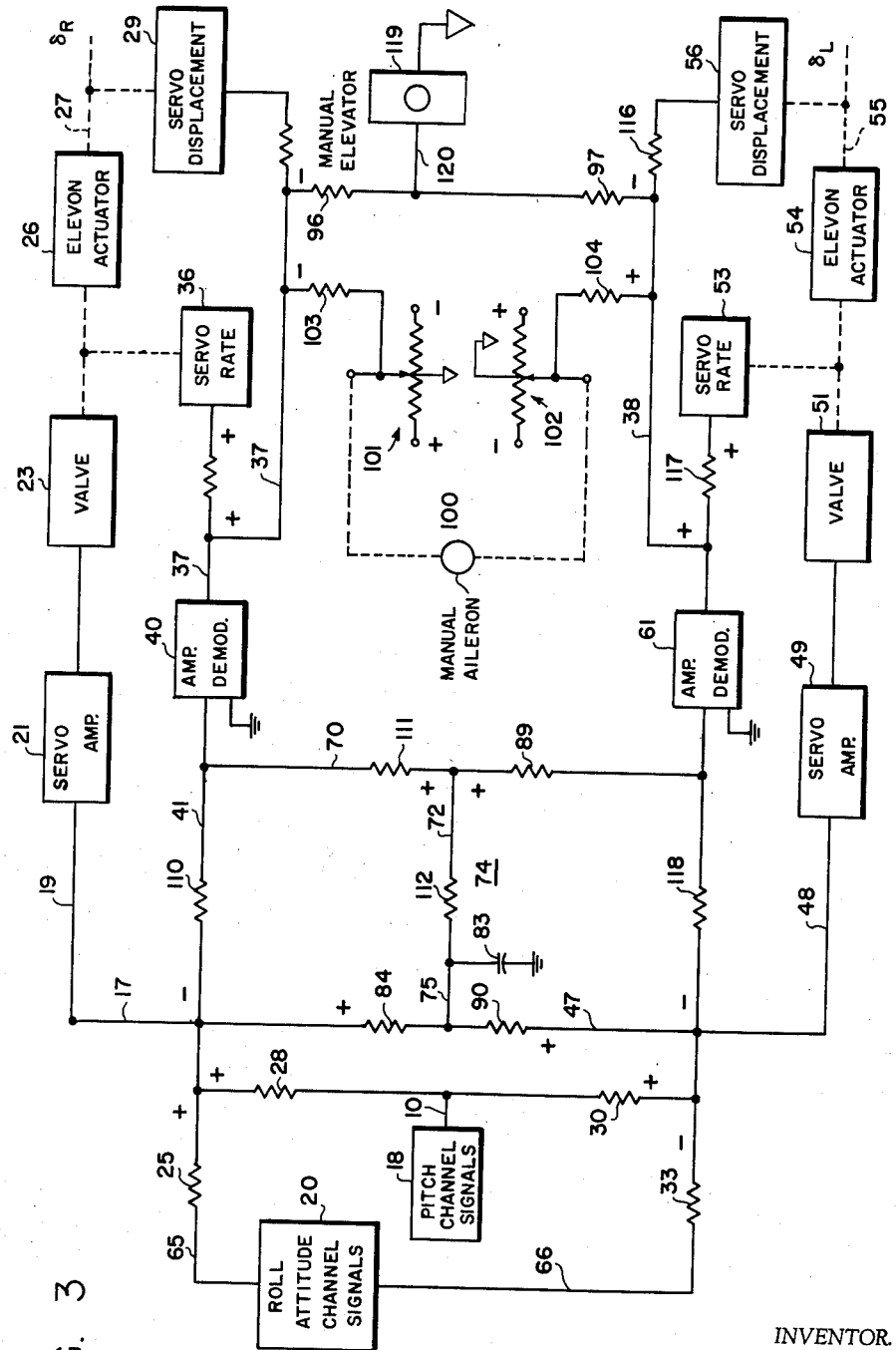
FIGURE 3 is an electrical schematic embodiment of the system in FIGURE 1.

FIGURE 3 is an electrical schematic of the arrangement shown in block form in FIGURE 1. It will be appreciated that various types of signals either D.C. or A.C. may be provided and that either series or parallel summing of such signals may be selected. In FIGURE 3, a source 18 of the pitch channel stabilizing or automatic control signals may consist conventionally of craft attitude sensing devices, craft pitch rate sensing devices and outer loop control devices such as altitude sensing devices. The output from the pitch channel signal source 18 is supplied through conductor 10 and through one summing resistor 28 to a signal summing conductor 17. The pitch channel signal source 18 may also be connected through a summing resistor 30 to a signal summing conductor 47.

Also roll attitude channel signals may be applied from a signal source 20 consisting of the conventional bank angle gyro, roll rate gyro, and other automatic control signal sources conventionally used. The signal from signal source 20 is supplied through conductor 65 and summing resistor 25 to the signal summing conductor 17. Also the signals from the roll channel or aileron function signal source 20 is supplied through conductor 66 and summing resistor 33 to summing conductor 47.

In the present arrangement parallel electrical summing of the signals from the various signal sources is provided by summing conductors 17 and 47. Further it will be appreciated that a single summing conductor such as 17 may replace the two summing devices 14, 17 in FIGURE 1. In FIGURE 3 as in FIGURE 1 the algebraic sign of the various signals or their relative polarity or phase is indicated by the conventional plus and minus symbols.

The output from summing conductor 17 is supplied through signal transmission means 19 to servoamplifier 21 which in turn controls the operation of valve positioning means for valve 23. The displacement of valve 23 effects the operation of the fluid type elevon actuator 26 which through its output means 27 positions the right elevon surface (not shown) of the craft. The operation of the valve 23 displaces a source of signal 36 which is an indication of servo rate or actuator rate. The actuator 26 operates a source of follow-up signal 29 indicative of the extent of actuator displacement from a normal position. The signal sources 36, 29 may be synchro A.C. type or of the potentiometer A.C. type. The signals from signal sources 29, 36 are supplied through suitable summing resistors to a summing conductor 37 which is connected to an amplifier demodulator 40 that converts the A.C. servo rate and servo displacement signals as summed to D.C. signals. The output from amplifier demodulator 40 is supplied through conductor 41 and summing resistor 80 to summing conductor 17.

Additionally the output of amplifier demodulator 40 is supplied through conductor 70 and summing resistor 81 and conductor 72 to the lag network 74 comprising resistor 82 and capacitor 83 having an RC value of T. The output from the lag network 74 is supplied to signal summing conductor 17 through summing resistor 84.

In a similar manner for the left elevon fluid type actuator 54, the signals on signal summing conductor 47 are applied by conductor 48 to the servoamplifier 49 which in turn operates or energizes operating means for valve 51 causing its displacement from a normal position. Valve 51 in turn as displaced controls the operation of the left elevon fluid actuator 54 with A.C. servo rate and servo feedback signals being supplied by signal sources 53, 56 to the amplifier demodulator 61 which has its output supplied directly through the summing resistor 88 to summing conductor 48 for control of servo amplifier 49. The output from amplifier demodulator 61 is also supplied through summing resistor 89 to summing conductor 72 where it is summed with the output from amplifier demodulator 40 through summing resistor 81.

The conductor 72 is connected to lag network 74 which has the proper gain so that the output on conductor 75 through summing resistor 84 and through summing resistor 90 to the respective summing conductors 17, 47 insofar as elevator function signals are concerned is the same as the lag output from either amplifier demodulator 40 or amplifier demodulator 61.

As in the FIGURE 1 arrangement, the direct output from amplifier demodulator 40 through summing resistor 80 to conductor 17 and the lagged output from amplifier demodulator 40 through summing resistor 84 to conductor 17 are of opposite signs and for steady state signals tend to cancel each other or in alternative phraseology provide a high pass servo feedback arrangement $$\frac{TS}{1+TS}$$

Insofar as aileron function signals are concerned the outputs from amplifier demodulator 40 and amplifier demodulator 61 due to their respective servo displacements normally cancel each other and thus there is no high passing effects applied to the aileron servo displacement feedback signals.

Manual elevator function control may be effected through an A.C. signal source 94 which may be a synchro or potentiometer which is manually adjusted. The output from signal source 94 is supplied through conductor 95 and alternatively through summing resistor 96 to summing conductor 37 or through summing resistor 97 to summing conductor 38.

For manual aileron function, a manually operable controller 100 for example operates two potentiometers 101, 102 respectively feeding through summing resistor 103 to summing conductor 37 and through summing resistor 104 to summing conductor 38. The aileron function arrangement is such that upon operation of the manual controller 100 in one direction a signal of one phase goes to summing conductor 37 and signal of opposite phase goes to summing conductor 38. This result may be obtained by moving both potentiometer sliders in their same directions but oppositely energizing their respective resistors or by moving the sliders in opposite directions while their respective resistors energizations are similarly phased.

It should be noted particularly that the so-called high pass effect or the cancelling of the steady state signal is not applied to either manually supplied inputs from controllers 94 or 100 due to the method of connecting these manual inputs into the amplifier control circuit relative to the position of the lag network 74.

It will be evident that a similar schematic arrangement for FIGURE 2 as that embodied in FIGURE 3 for the block diagram of FIGURE 1 may be readily provided.

While there has been described what at present may be considered a preferred embodiment of the invention, it will be obvious to those skilled in the art that numerous alterations and modifications may be made therein without departing from the invention, and it is therefore the intention in the appended claims to cover all such equivalent variations as fall within the true spirit and scope of the invention above.

What is claimed is new and desired to be secured by Letters Patent of the United States is:

1. In control apparatus for an aircraft having two control surfaces operable in the same direction to alter pitch attitude of the craft and operable in opposite directions to alter roll attitude; power means operating each surface; sensing means detecting change in craft attitude about the pitch and roll axes; follow-up means driven by the power means; and control means for said power means responsive to said sensing means and follow-up means, said follow-up means including means providing integral control for the pitch attitude and proportional control for the roll attitude of the craft.

2. In control apparatus for an aircraft of the type having two control surfaces operable in the same direction to alter craft attitude about an axis, two power means one power means operating each surface; signal providing sensing means detecting change in craft attitude about the axis; followup signal providing means driven by the power means; and control means for said power means responsive to said sensing means and to said followup means, said followup means providing a signal proportional to the power means displacement and a signal of opposite phase in accordance with power means displacement transmitted through a lag device.

3. In control apparatus for an aircraft having two attitude changing means operable to alter attitude of the craft about an axis thereof and means for operating said attitude changing means; signal providing sensing means detecting change in craft attitude about the axis; follow-up means controlled by the operating means and providing two follow-up signals proportional to the displacement of both attitude changing means; two combining means each responsive to one of the follow-up signal and the sensing means signal; and time element means connected to each combining means and jointly controlled by both follow-up signals cancelling the effect of said follow-up signals on said combining means.

4. In a follow-up type of motor control system, in combination: automatic means supplying a first command signal; a servomotor, means providing a signal proportional to servo displacement and driven by said servomotor; a lag device responsive to said servomotor signal having an output signal of opposite phase; and means controlling said servomotor from said command signal, said servomotor signal, and the signal from the lag device to provide time integral control of the motor control system from the first command signal; and manual means supplying a second command signal to the motor control system to obtain a displacement thereof proportional to the magnitude of the manual command signal.

5. In control apparatus for an aircraft having two control surfaces operable in the same direction to alter pitch attitude of the craft, a power means operating each surface; sensing means detecting change in craft position; a followup means driven by each power means; a time element lag device jointly controlled by both power means and having an output; and means controlling each power means from the change in craft position signal, the extent of displacement of said power means, and the output of the lag device to permit the power means to have a steady state displacement during absence of a position signal.

6. The apparatus of claim 5, means detecting a different change in condition of the craft; and means controlling both said power means in opposite directions from said second condition sensing means, and the extent of displacement of said two power means.

7. Apparatus for controlling two conditions of a craft comprising: sensing means providing a separate signal in accordance with each condition; means providing a separate signal in accordance with the extent of displacement of the two condition changing means; means including a lag device responsive to the two signals from the condition changing means; and means combining the signals from each sensing means, from said condition changing means, and from said lag device whereby the two condition changing means may be positioned in accordance with the sum of said signals.

8. In control apparatus for an aircraft having elevon control surfaces operable in the same direction for pitch attitude control and operable in opposite directions for roll attitude control each surface having a separate actuating means therefor, in combination: signal providing means responsive to changes in roll attitude providing two separate signals of opposite sense; signal providing means responsive to change in pitch attitude providing two separate signals of the same sense; means operated by said two actuators providing two separate feedback signals in accordance with the direction of operation of each actuator from a normal position; means combining the two feedback signals from displacement of said two actuators; a lag device receiving said combined feedback signals and providing an output; and means controlling each actuator from the sum of the roll attitude signal, the pitch attitude signal, the servo displacement feedback signal, and the output of the lag device wherein the actuators are controlled by roll attitude signals of opposite sense.

9. In control apparatus for an aircraft having two control surfaces operable in the same direction to alter pitch attitude of the craft and operable in opposite directions to alter roll attitude of the craft, each surface having a separate actuating means therefor, in combination: pitch attitude sensing means, roll attitude sensing means, means providing two separate signals from each sensing device one sensing device providing two signals of the same sense the other providing two signals of opposite sense; means providing two separate signals in accordance with the displacements of both actuating means from a normal position; means including a lag device combining the two actuator displacement signals; and means controlling one actuating means in accordance with the sum of the roll attitude signal, the pitch attitude signal, the actuator displacement signal, and the output of the lag device; and means for controlling the other actuating means by the sum of the roll attitude signal of opposite sense, the pitch attitude signal, the displacement of the actuating means and the output of the lag device.

10. Apparatus for controlling a craft about two respectively perpendicular axes and having two attitude changing means operable similarly to provide a turning moment of the craft about one axis and differentially operable to control the craft about a second axis; means providing a signal for controlling the craft about one axis; means providing a signal for controlling the craft about a second axis; followup signal providing means operated in accordance with the displacement of each attitude changing means; means combining the signals from each sensing means, from the attitude changing means, and controlling both attitude changing means; and time element means connected to said attitude changing means and controlled by the followup signals therefrom to render substantially steady state signals from said followup means ineffective for operating the attitude changing means.

11. In control apparatus for a dirigible craft having two attitude changing means, operable in the same direction to alter craft attitude about one axis and differentially operable to alter attitude of the craft about a second axis; a power means operating one attitude changing means; a second power means operating the other attitude changing means; sensing means detecting change in craft attitude about the first axis, sensing means detecting change in craft attitude about the second axis; followup means driven by each attitude changing means; and control means for each power means responsive to both sensing means and its respective followup means; and time element means controlled by both followup means providing integral control of the craft attitude about one axis and proportional control of the craft about a second axis.

12. Apparatus of claim 11, and manual means for providing a signal to said apparatus to effect operation of said attitude changing means proportional to the magnitude of the manual control signal.

13. In control apparatus for an aircraft having two control surface attitude changing means adapted to control the craft attitude relative to the pitch axis thereof, signal responsive means connected to move each attitude changing means; means supplying a continuous signal proportional to the change in pitch attitude desired; means for producing a continuous signal in accordance with the extent of operation of each attitude changing means; means for controlling each signal responsive means; and time element means jointly responsive to each followup signal from the attitude changing means cancelling the steady state signals from said followup means to each signal responsive means.

14. In control apparatus for an aircraft having two attitude changing means operable to alter attitude of the craft about an axis thereof and means for operating said attitude changing means; command signal providing means; followup means controlled by the operating means and providing two followup signals in accordance with the displacement of both attitude changing means; two signal combining means each responsive to one followup signal and the command signal; and time element means connected to each combining means and jointly controlled by both followup signals cancelling the effect of said two followup signals on said two signal combining means.

15. In control apparatus for an aircraft of the type having two control surfaces operable in the same direction to alter craft attitude about an axis, two power means, one individual power means operating each surface; signal providing sensing means detecting changes in craft attitude about the axis; followup signal providing means driven by the power means; and control means for said power means responsive to said sensing means and to said followup means, said followup means providing a signal proportional to the power means displacement; and time element means connected to render substantially steady state signals from said followup means ineffective on said control means.

16. In control apparatus for an aircraft having two control surfaces operable in the same direction to alter pitch attitude of the craft and means for operating each surface; signal providing sensing means detecting changes in craft position; a followup signal providing means driven by each operating means; control means responsive to both signals and providing an output; time element means connected to both control means and jointly controlled by both followup signal providing means to render substantially ineffective steady state signals from the followup signal providing means, to enable the operating means for each surface to have a steady state displacement during subsequent absence of a position error signal from said sensing means.

17. The apparatus of claim 16, wherein the time element means comprises a passive lag network including a resistor and shunting capacitor.

18. The apparatus of claim 17, and trim motor means providing a signal to said control means for unloading said lag network.

19. In control apparatus for an aircraft of the type having two control surfaces operable in the same direction to alter craft attitude about an axis, two power means, one individual power means operating each surface; signal providing sensing means detecting change in craft attitude about the axis; followup signal providing means driven by the power means; a lag device for one of said signal providing means; and control means for each of said power means responsive to said sensing means, to said followup means, and to said lag device, for providing integral control of both said power means.

References Cited in the file of this patent

UNITED STATES PATENTS

| | | |
|---|---|---|
| 2,683,003 | Kutzler | July 6, 1954 |
| 2,981,500 | Carlton | Apr. 25, 1961 |